United States Patent [19]
Bogdanowicz et al.

[11] Patent Number: 5,793,418
[45] Date of Patent: Aug. 11, 1998

[54] SHADING CORRECTION ON A CRT TELECINE

[75] Inventors: Mitchell J. Bogdanowicz, Spencerport; Christopher L. Dumont, Rochester, both of N.Y.; Nestor M. Rodriguez, Coral Springs, Fla.

[73] Assignee: Eastman Kodak Company, Rochester, N.Y.

[21] Appl. No.: 704,192

[22] Filed: Aug. 28, 1996

[51] Int. Cl.$^6$ .................................................. H04N 7/18
[52] U.S. Cl. .................................................. 348/97; 348/100
[58] Field of Search .................................. 348/96, 97, 98, 348/99, 100, 101, 104, 108, 109

[56] References Cited

U.S. PATENT DOCUMENTS

| | | | |
|---|---|---|---|
| 3,935,589 | 1/1976 | Ohta | 348/101 |
| 5,327,247 | 7/1994 | Osborne et al. | 348/100 |
| 5,337,164 | 8/1994 | Yabe et al. | 348/97 |

*Primary Examiner*—Amelia Au
*Attorney, Agent, or Firm*—Andrew J. Anderson

[57] ABSTRACT

A process and system for forming a video image with a telecine transfer device is disclosed, the process comprising converting a photographic film image into video signals representative of the image with a telecine transfer device which uses a cathode ray tube flying spot scanner in combination with at least one dichroic beam splitting mirror to separate the light from the cathode ray tube into component spectral segments which are then detected by a light detector, wherein a filter is positioned between the dichroic mirror and the light detector to compensate for an inconsistent spectral distribution of light in at least one component spectral segment resulting from a varying angle of incidence of light originating from various positions of the cathode ray tube onto the dichroic mirrors, said filter reducing the magnitude of the range of spectral change due to the varying angle of incidence. In preferred embodiments of the invention, the light from the cathode ray tube is separated into red, green and blue component segments. In a particularly preferred embodiment, a properly designed filter is used such that the spectral distribution of light that reaches the green component light detector results in a substantially consistent side-to-side contrast detection with various photographic film stocks. The instant invention differs from previous methods of shading correction in that the correction is being done optically instead of electronically. The optical correction is substantially film independent.

20 Claims, 5 Drawing Sheets

SHADING CORRECTION ON A CRT TELECINE

FIELD OF THE INVENTION

The invention relates to a use of properly designed filters in a cathode ray tube (CRT) flying spot scanner telecine transfer device which result in consistent side-to-side contrast detection for transfers made from various photographic film stocks.

BACKGROUND

Color negative films are a class of photosensitive materials that map the luminance (neutral) and chrominance (color) information of a scene to complementary tonal and hue polarities in the negative film. Light areas of the scene are recorded as dark areas on the color negative film, and dark areas of the scene are recorded as light areas on the color negative film. Colored areas of the scene are recorded as complementary colors in the color negative film: red is recorded as cyan, green is recorded as magenta, blue is recorded as yellow, etc. In order to render an accurate reproduction of a scene, a subsequent process is necessary to reverse the luminance and chrominance information back to those of the original scene. This subsequent process may or may not require another photosensitive material.

In the motion picture industry, there are two common subsequent processes. One such subsequent process is to optically print (by contact or optics) the color negative film onto another negative working photosensitive material, such as Eastman Color Print Film 5386™.

Another subsequent process in the motion picture industry is to transfer the color negative film information directly into a video signal using a telecine transfer device, or indirectly by first making a positive photographic print and then transferring the print film information into a video signal using such a device. A telecine is a device which scans a photographic element (comprising either a positive or a negative image) and transforms the image into analog electrical signals or digital data. This data is used to display the image on a monitor or may be transmitted and viewed as a television signal, or recorded either digitally or analog on magnetic tape for storage or distribution. Various types of telecine transfer devices are described, for example, in *Engineering Handbook*, E. O. Fritts, Ed., 8th edition, National Association of Broadcasters, 1992, Chapter 5.8, pp. 933–946, the disclosure of which is incorporated by reference. Telecine devices scan each negative or positive film frame transforming the transmittance at each pixel of an image into voltage. Signal processing then inverts the electrical signal in the case of a transfer made from a negative film in order to render a positive image. The signal is carefully amplified and modulated, and fed into a cathode ray tube monitor to display the image reproduction, or recorded onto magnetic tape for storage. The most popular of such devices employ a cathode ray tube (CRT) flying spot scanner (FSS) 10, as illustrated in FIG. 1, such as the Rank Cintel FSS telecine. For telecines employing CRT scanners, the image is actually recorded by scanning a film element 21 supplied on film transport means 20 with a single "flying spot" of light generated by an electronic beam which traverses the tube 10 from left to right and from the top to bottom. The light level and color of the spot is changed as it passes through the film element. The light is then passed through a projection lens 30, and broken down into three component colors by means of beam splitter 40 comprising dichroic mirrors, and each light component collected with an opto-electronic transducer such as a photomultiplier tube (PMT) detector 50 as a linear analog signal. While the PMT for the green component only is illustrated in FIG. 1, each of the light components are detected by separate PMTs. In the Rank Cintel FSS telecine design, there is a conventional red filter and a red dichroic filter in the red channel positioned over the red component PMT which positions the red spectral response to detect both positive and negative film stocks. The blue channel does not have a filter because the blue energy output of the CRT is low and increased filtration would reduce the signal to noise of the blue transfer. The green channel has a yellow filter positioned over the green PMT to reduce blue channel crosstalk. Each compenent signal is then processed (e.g., amplification, phosphor afterglow correction, CRT and lens system shading correction, color masking, gamma adjustment, frame rate conversion, digitization, etc.) with video signal processing means 60, and then displayed and/or recorded.

To assure a high quality transfer of the film image to the electronic image, careful attention is directed towards the uniformity of the CRT. Because of the nature of the CRT and the optics of the system, telecine manufacturers such as Rank have developed means of electronically correcting the "shading" of the CRT as part of the video signal processing to produce a uniform field for transfer. The term shading refers to the change in intensity or color from side-to-side or top-to-bottom of the displayed image. Older telecines relied on circuit boards which could be trimmed to achieve a balanced field. More modern units have an autocorrection feature (look-up table) which is activated upon startup.

However, in practice, even if the field is perfectly corrected to compensate for nonuniformities in the CRT at startup in the "open gate" (no film in the exposing gate) mode, a colored shading problem has been found to exist when film is placed in the gate. A uniform patch of middle gray on a film strip is usually used to determine the degree of shading color. This patch is balanced for neutrality in the center of the field. The color of the shading is usually observed as magenta on the left to green on the right going through neutral in the center. The observed color change may be reversed depending on the mode in which the telecine is operating (i.e., positive or negative). The effect is identical when the film stock is reversed, however, indicating it is a telecine problem not a film uniformity problem.

Attempts have been made in the industry to electronically "correct" the shading observed with the uniform gray film in the gate. When actual film scenes are transferred, however, the different densities of the image frequently still require alternate shading correction to attain perfect uniformity. Also, the degree of correction required has been dependent upon the film type, thus, any mixing of film stocks within a project presents further problems.

PROBLEMS TO BE SOLVED

It would be desirable to provide a process and system for converting photographic film images into video images with a telecine transfer device comprising a cathode ray tube flying spot scanner in combination with dichroic beam splitting mirrors wherein shading problems are minimized.

SUMMARY OF THE INVENTION

One embodiment in accordance with the invention comprises a process for forming a video image with a telecine transfer device comprising converting a photographic film image into video signals representative of the image with a telecine transfer device which uses a cathode ray tube flying spot scanner in combination with at least one dichroic beam splitting mirror to separate the light from the cathode ray tube into component spectral segments which are then detected by a light detector, wherein a filter is positioned between the dichroic mirror and the light detector to compensate for an inconsistent spectral distribution of light in at least one component spectral segment resulting from a varying angle of incidence of light originating from various positions of the cathode ray tube onto the dichroic mirrors, said filter reducing the magnitude of the range of spectral change due to the varying angle of incidence.

Another embodiment of the invention comprises a system for forming a video image comprising (a) a photographic film image and (b) a telecine transfer device comprising a cathode ray tube flying spot scanner, a lens, film transport means for transporting the photographic film image between the cathode ray tube scanner and the lens, at least one dichroic beam splitting mirror for separating light from the cathode ray tube after it passes through the photographic film image into component spectral segments, an optoelectronic transducer light detector, and video signal processing means for converting an electronic signal generated by the light detector into a video image signal, wherein a filter is positioned between the dichroic mirror and the light detector to compensate for an inconsistent spectral distribution of light in at least one component spectral segment resulting from a varying angle of incidence of light originating from various positions of the cathode ray tube onto the dichroic mirror, said filter reducing the magnitude of the range of spectral change due to the varying angle of incidence.

In preferred embodiments of the invention, the light from the cathode ray tube is separated into red, green and blue component segments. In a particularly preferred embodiment, a properly designed filter is used such that the spectral distribution of light that reaches the green component light detector results in a substantially consistent side-to-side contrast detection with various photographic film stocks.

ADVANTAGES

The instant invention differs from previous methods in that the shading correction is being done optically instead of electronically. The optical correction is substantially film independent.

DETAILED DESCRIPTION OF THE INVENTION

Figure 1:
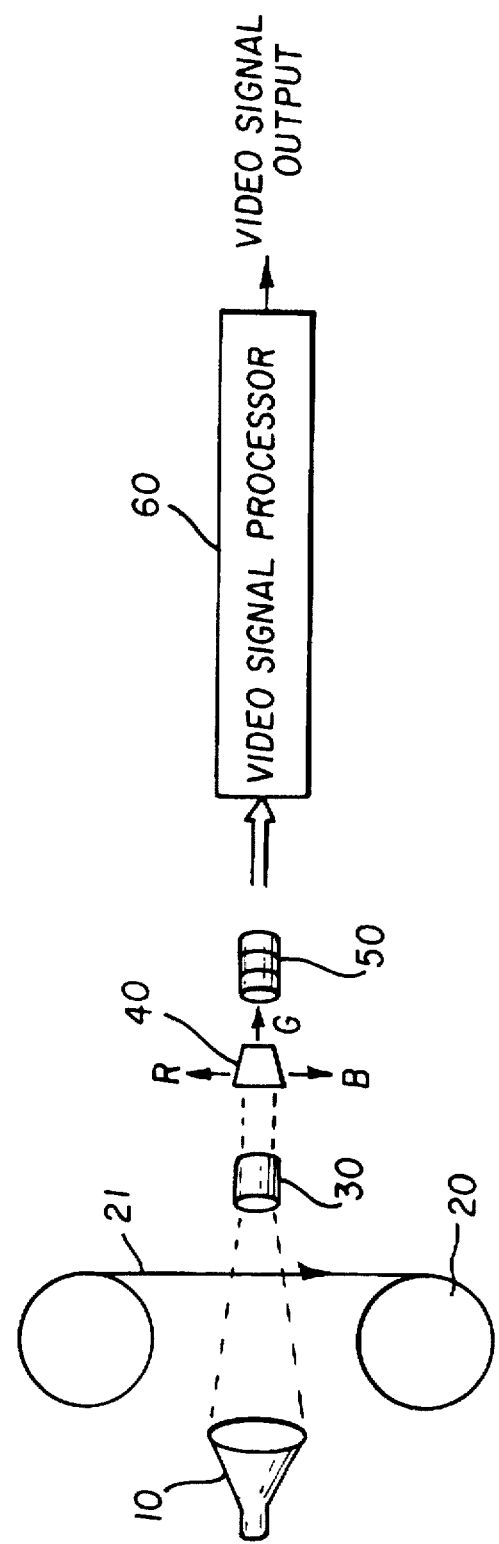
FIG. 1 is a schematic illustration of a cathode ray tube flying spot scanner telecine.

CRTs used in telecines are not point light sources, rather they are tubes approximately 5 inches across. Telecines which employ CRTs typically use dichroic beam splitting mirrors to separate the light from the CRT into component red, green and blue spectral segments. The three component channels, red, green and blue, separated by the dichroic beam splitting mirrors are typically detected by PMT detectors.

The spectral characteristics of a dichroic mirror depend on the angle of incidence of the light. For example, a dichroic filter that passes light from 400 nm to 600 nm and reflects light from 600 nm to 700 nm will look cyan to a human observer in normal white daylight when viewed directly perpendicular to the filter. If this filter is then angled away from the perpendicular position, the observed color will change from cyan to blue. This is due to the light striking the filter at an angle other than 90 degrees. Therefore, any dichroic mirror (or dichroic filter, which is a dichroic mirror coated on a transparent media such as glass) has a nominal transmission (or reflectance) characteristic perpendicular to its surface and a spectral shift towards shorter wavelengths at any other angle. In the optical design of telecines employing CRTs and dichroic beam splitting mirrors such as the Rank Cintel FSS telecines, there is a difference in the angle of incidence of the light originating from the left side of the CRT onto the dichroic mirrors to that of the light side of the CRT. This side-to-side spectral difference interacts with the imaging dyes in the film stock which results in small detected component contrasts which are observed as a shading defect.

In order to demonstrate the side-to-side spectral difference resulting from the optical design of telecines employing CRTs and dichroic beam splitting mirrors, the following experiment was conducted.

A piece of photographic film exposed and developed to maximum density (Dmax) seven frames long was slit to create a single aperture on each film frame. Each aperture was one-seventh of a frame width (perforation to perforation) extending from the bottom to the top of the film frame. Each aperture was offset by one-seventh of a frame for each of the seven consecutive frames to sample the light coming through the telecine film gate from left to right. Spectral measurements were made with a Spectroradiometer through all the optics (including lenses, filters and mirrors) of a Rank Cintel FSS telecine just short of the PMT for each color channel. Measurements were made for each of the seven bands across the film gate.

The largest spectral difference was found in the green channel on the farthest left and right slits, confirming that the angular position of the incident light on the dichroic mirrors was indeed the cause of the shading problem. To rule out a polarization effect, the above measurements were made under three conditions to determine the variation in polarization across the film gate. These were: 1) polarizing filter above gate with polarization axis perpendicular, 2) polarization axis parallel and 3) no polarizing filter. This was repeated with both acetate based and polyester based film stocks. It was determined that polarization was not the main cause of the telecine shading problem. Film base types also had no effect. While the invention is further described in accordance with filters used to compensate for spectral differences observed for the green channel, as this channel exhibited the largest left-to-right differences, it will be apparent that spectral corrections in accordance with the invention may additionally or alternatively be performed for the blue and red light component channels if desired.

Figure 2:
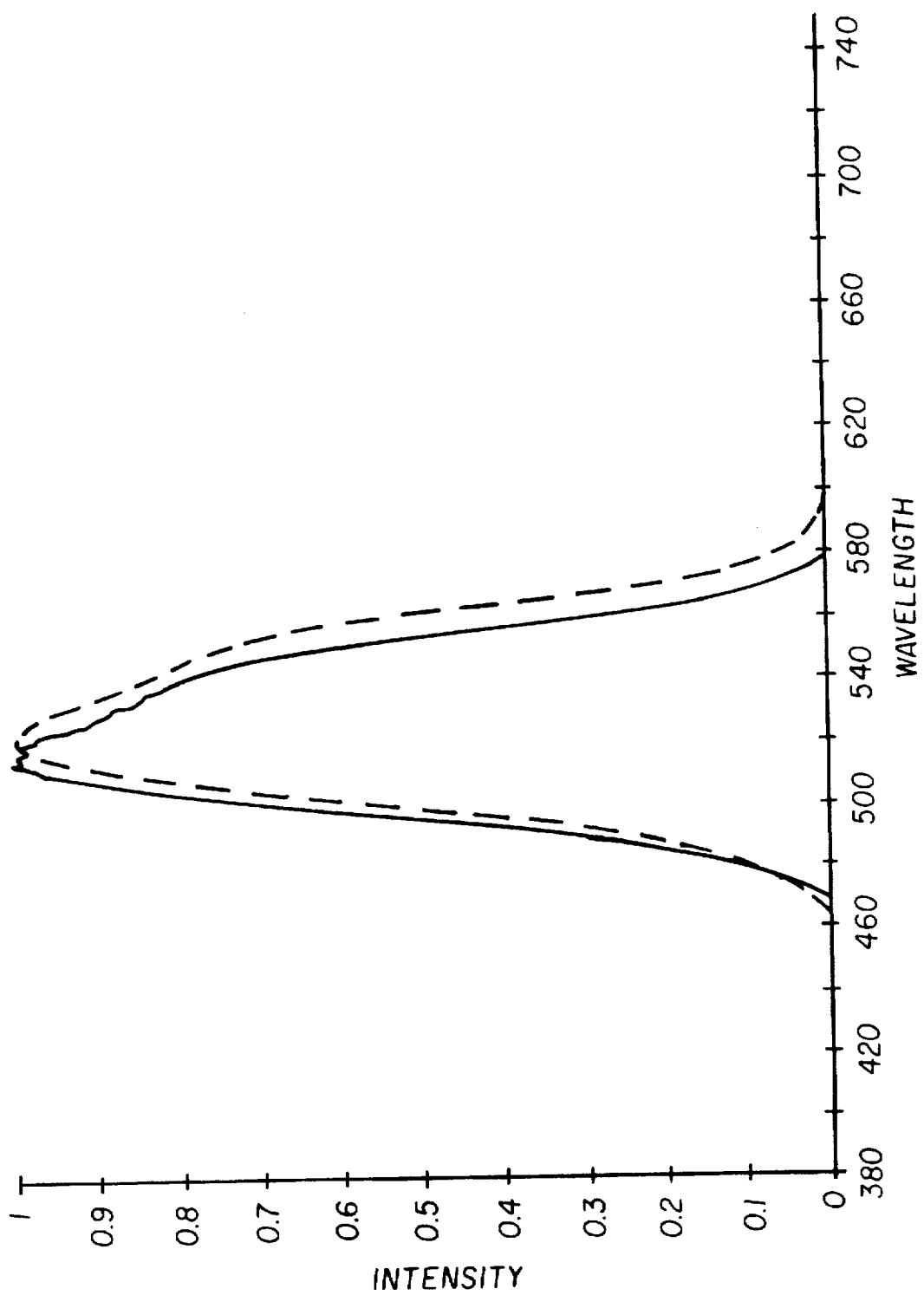
FIG. 2 is a graph of Intensity vs. Wavelength depicting the spectral characteristics of the left and right sides of the green channel of a cathode ray tube flying spot scanner telecine in accordance with the prior art.

The spectral characteristics of the left and right sides of the green channel are shown in FIG. 2. The main difference is in the long wavelength (right) side of the curves. This difference in spectral quality results in the telecine device detecting a difference in density across the frame when one may not exist.

Figure 3:
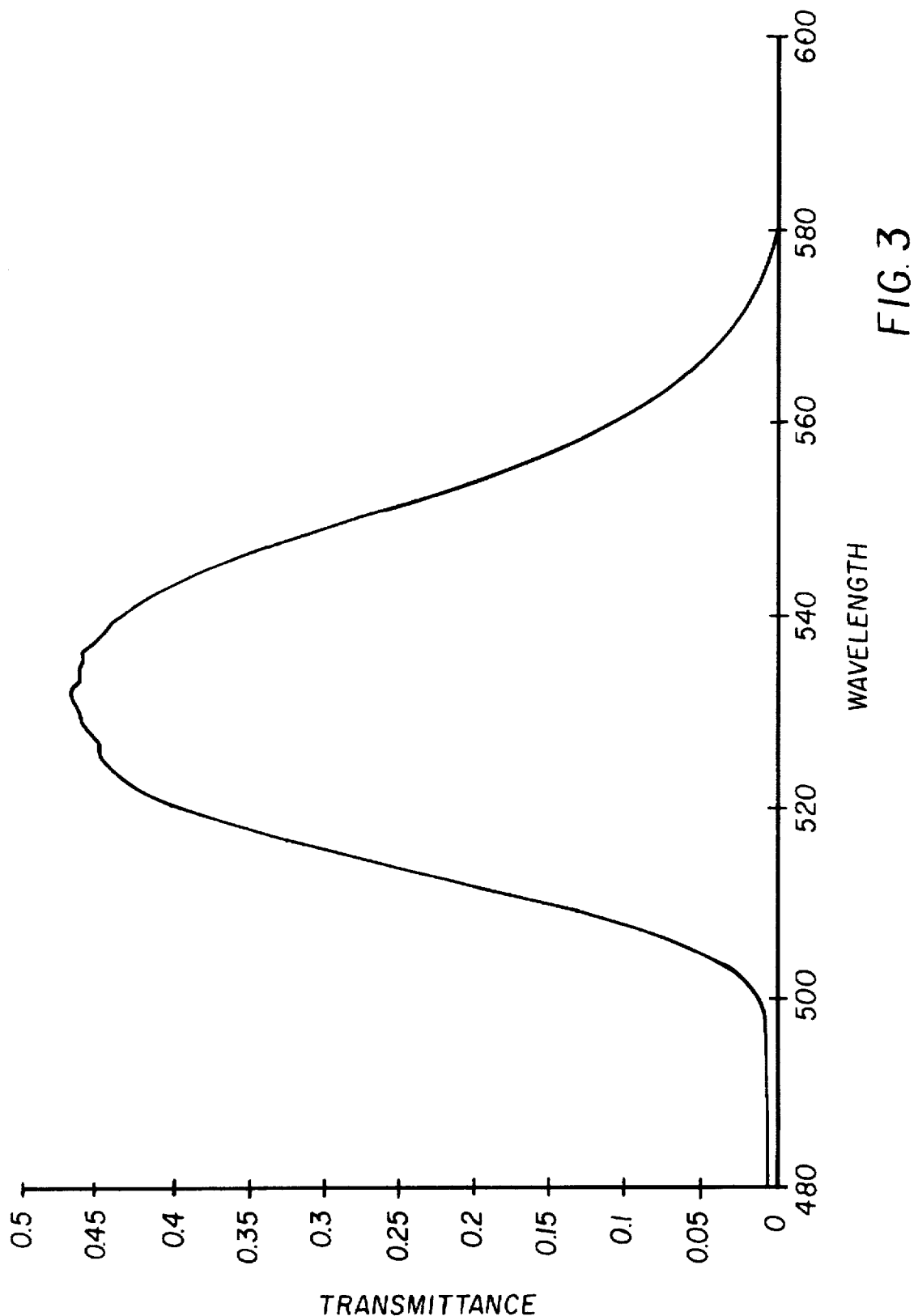
FIG. 3 is a graph of Transmittance vs. Wavelength for a filter designed for use in the green channel of a cathode ray tube flying spot scanner telecine in accordance with the invention.
Figure 4:
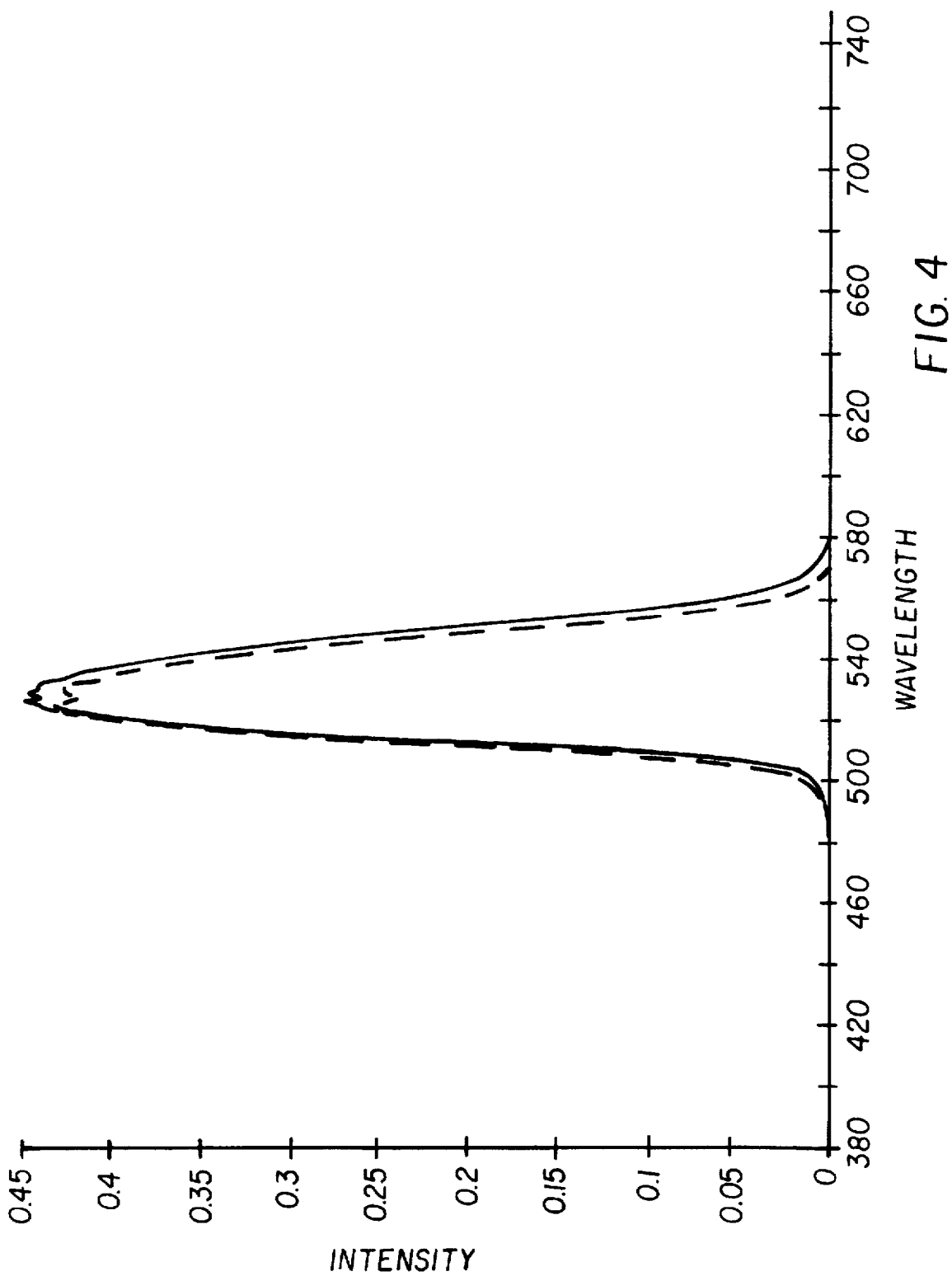
FIG. 4 is a graph of Intensity vs. Wavelength depicting the spectral characteristics of the left and right sides of the green channel of a cathode ray tube flying spot scanner telecine in accordance with the invention.

In order to correct this deficiency, a new filter (FIG. 3) was used to compensate for the inconsistent spectral distribution of light in the green component spectral segment resulting from a varying angle of incidence of light originating from various positions of the cathode ray tube onto the dichroic mirrors. The new filter was a green filter designed to transmit visible light substantially only of wavelengths which fell within the spectral response curves obtained for both the left and right sides of the green channel, and was made by Tiffen Manufacturing Corp., Hauppauge, N.Y., to specifications to meet the spectral shape illustrated in FIG. 3. When this filter is placed in the filter holder of the green channel PMT, replacing the current yellow filter supplied with the telecine, the transmitted light is essentially spectrally homogeneous from left to right (FIG. 4). The spectral shape of the filter illustrated in FIG. 3 was designed to minimize spectral changes from side-to-side while allowing ample light through put for a good signal to noise ratio. Also, the design will alleviate differences in the amount of shading problems encountered from one telecine to the next due to manufacturing variability of the component dichroic mirrors and the associated optics. A very narrow band filter could be used with the major transmission wavelength near 550 nm, however, too much light may be lost and the resultant signal may be too weak for certain applications. This invention, however, encompasses the range of filtration from narrow to broad where the preferred position being the filter as in FIG. 3, i.e., a green filter which transmits visible light having wavelengths between about 500 and 580 nm only, which reduces the difference from side-to-side to approximately 1% of the total signal. The effect of the filter in FIG. 3 on the right and left side light spectral distribution is shown in FIG. 4. The two sides are nearly identical.

Any filter material capable of transmitting the desired spectral regions of the light spectrum may be used in forming filters for use in accordance with the present invention, including, e.g., dyed glass, gelatine filters (e.g., Kodak Gelatine Filters), Wratten filters, and custom filters made from organic or inorganic dyestuffs as are well known in the filter art. In the case of dye filters selected for use in the present invention, the filter would absorb a desired band, or bands, of radiation and transmit the rest. Combinations of yellow (minus-blue) and cyan (minus-red) filters may be used to form a filter which passes substantially only green light for use in preferred embodiments of the invention.

EXAMPLE OF THE USE OF THE INVENTION

Two films currently in common use are motion picture negative film Eastman EXR 5600 and intermediate film Eastman Color Intermediate 5244. The Eastman EXR 5600 is a camera original negative stock which when transferred to video via telecine is electronically inverted from the negative image to a positive image. The shading problem with a negative material is exhibited by a magenta (left) to green (right) color shift. In the case of Eastman Color Intermediate 5244, which is used to print an original negative, the resulting image is already positive and an inversion is not required. The color shift shading problem in this case is green (left) to magenta (right).

A uniform gray image in a frame for each of the stocks was transferred via a Rank Mark III telecine and the change in green IRE (Institute of Radio Engineers) luminance unit values on the waveform monitor across the field was recorded. Both films were used with the Rank supplied yellow filter in the green channel PMT filter holder and then with the filter from FIG. 3.

Figure 5:
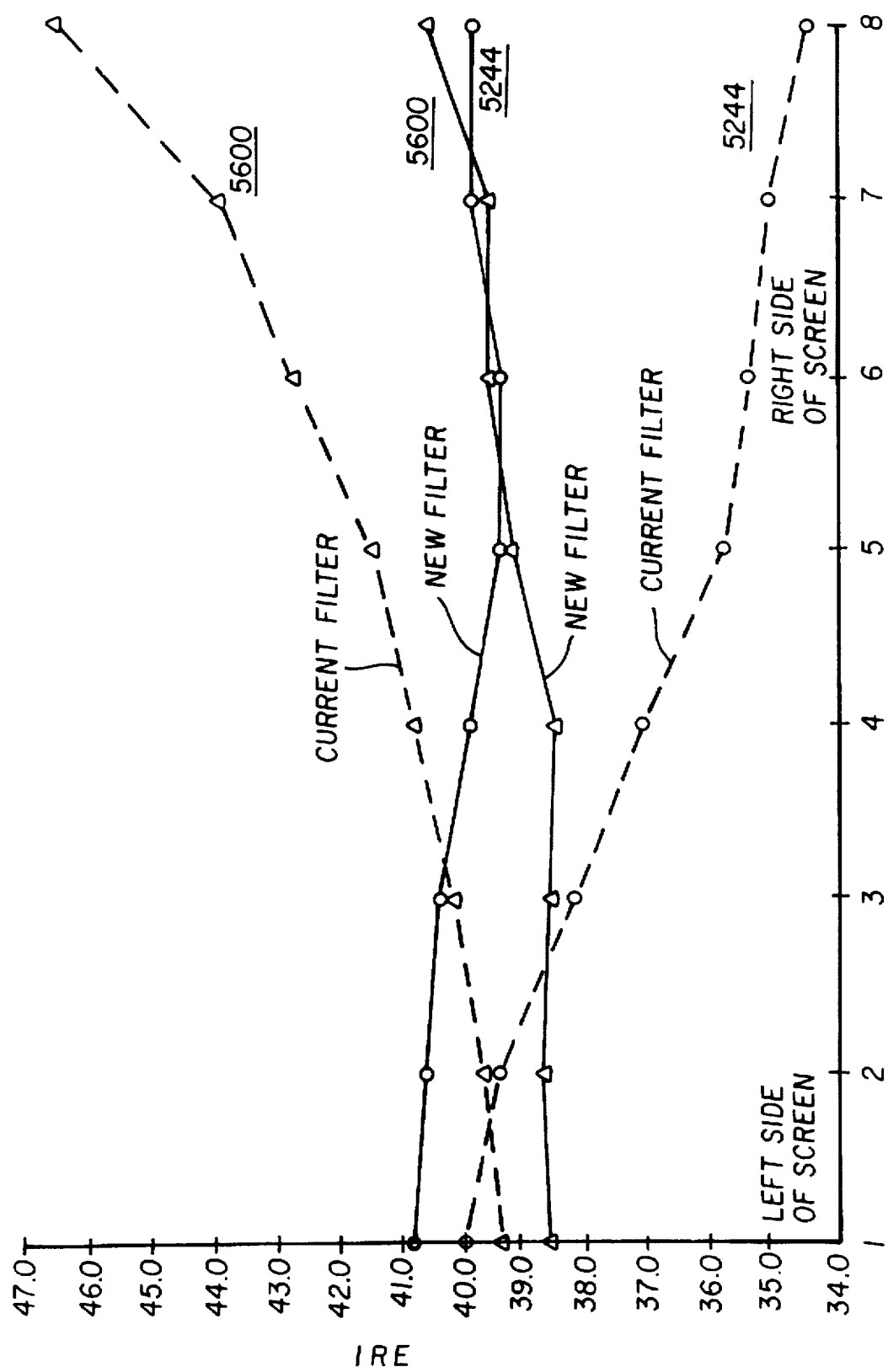
FIG. 5 is a graph comparing green IRE luminance vs. field screen position for uniform gray images for two film stocks transferred via a Rank Mark III telecine in accordance with the prior art and in accordance with the invention.

The results are reported graphically in FIG. 5. The pair of curves with square markers corresponds to the Eastman EXR 5600. The dashed line is the result with the Rank filter and the solid line with the new filter. The pair of curves with circle markers corresponds to the Eastman Color Intermediate 5244. The dashed line is the result with the Rank filter and the solid line with the new filter. Each solid line shows a range of IRE values less than 2 (approximately 1) IRE units throughout the field, while the current filter (dashed lines) has a range of greater than 5 IRE units for the Eastman Color Intermediate 5244 and about 7 IRE units for Eastman EXR 5600. The fields with the Rank supplied filter visually detected a color shift from left to right, while the same fields with the new filter did not show a detectable color shift.

While the invention has been described in detail with particular reference to preferred embodiments, it will be understood that variations and modifications can be effected within the spirit and scope of the invention.

We claim:

1. A process for forming a video image with a telecine transfer device comprising converting a photographic film image into video signals representative of the image with a telecine transfer device which uses a cathode ray tube flying spot scanner in combination with dichroic beam splitting mirrors to separate light from the cathode ray tube into component spectral segments which are then detected by a light detector, wherein a filter is positioned to compensate for an inconsistent spectral distribution of the light in at least one component spectral segment resulting from a varying angle of incidence of the light originating from various positions of the cathode ray tube onto the dichroic mirrors, said filter reducing the magnitude of the range of spectral change due to the varying angle of incidence.

2. A process according to claim 1, wherein the light from the cathode ray tube is separated into red, green and blue component segments.

3. A process according to claim 2, wherein the filter is positioned before the green component segment light detector such that the spectral distribution of light that reaches the green light detector results in a substantially consistent side-to-side contrast detection.

4. A process according to claim 3, wherein the filter is a green filter which transmits visible light having wavelengths between about 500 and 580 nm only.

5. A process according to claim 3, wherein the light detector comprises a photomultiplier tube.

6. A process according to claim 3, wherein the photographic film image is a negative image.

7. A process according to claim 3, wherein the photographic film image is a positive image.

8. A process according to claim 1, wherein the light detector comprises a photomultiplier tube.

9. A process according to claim 1, wherein the photographic film image is a negative image.

10. A process according to claim 1, wherein the photographic film image is a positive image.

11. A system for forming a video image comprising (a) a photographic film image and (b) a telecine transfer device comprising a cathode ray tube flying spot scanner, a lens, film transport means for transporting the photographic film image between the cathode ray tube scanner and the lens, beam splitter means comprising at least one dichroic beam splitting mirror for separating light from the cathode ray tube after it passes through the photographic film image into component spectral segments, an opto-electronic transducer light detector, and video signal processing means for converting an electronic signal generated by the light detector into a video image signal, wherein a filter is positioned between the dichroic mirror and the light detector to compensate for an inconsistent spectral distribution of light in at least one component spectral segment resulting from a varying angle of incidence of light originating from various positions of the cathode ray tube onto the dichroic mirror, said filter reducing the magnitude of the range of spectral change due to the varying angle of incidence.

12. A system according to claim 11, wherein the beam splitter means separates light from the cathode ray tube into red, green and blue component segments.

13. A system according to claim 12, wherein the filter is positioned before a green component segment light detector such that the spectral distribution of light that reaches the green light detector results in a substantially consistent side-to-side contrast detection.

14. A system according to claim 13, wherein the filter is a green filter which transmits visible light having wavelengths between about 500 and 580 nm only.

15. A system according to claim 13, wherein the light detector comprises a photomultiplier tube.

16. A system according to claim 13, wherein the photographic film image is a negative image.

17. A system according to claim 13, wherein the photographic film image is a positive image.

18. A system according to claim 11, wherein the light detector comprises a photomultiplier tube.

19. A system according to claim 11, wherein the photographic film image is a negative image.

20. A system according to claim 11, wherein the photographic film image is a positive image.

* * * * *